(12) United States Patent
Frazier et al.

(10) Patent No.: US 10,013,270 B2
(45) Date of Patent: Jul. 3, 2018

(54) APPLICATION-LEVEL INITIATION OF PROCESSOR PARAMETER ADJUSTMENT

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 14/958,148

(22) Filed: Dec. 3, 2015

(65) Prior Publication Data
US 2017/0161088 A1 Jun. 8, 2017

(51) Int. Cl.
G06F 9/46 (2006.01)
G06F 9/455 (2018.01)
G06F 9/445 (2018.01)

(52) U.S. Cl.
CPC .......... G06F 9/45558 (2013.01); G06F 9/445 (2013.01)

(58) Field of Classification Search
CPC ............................ G06F 9/45558; G06F 9/445
USPC ............................................................ 718/1
See application file for complete search history.

(56) References Cited

U.S. PATENT DOCUMENTS

| | | | |
|---|---|---|---|
| 6,138,212 A * | 10/2000 | Chiacchia | G06F 9/383 711/131 |
| 6,725,112 B1 * | 4/2004 | Kaminsky | G06Q 10/04 700/103 |
| 8,327,358 B2 | 12/2012 | Mangione-Smith | |
| 8,756,582 B2 | 6/2014 | Serrano | |
| 8,935,694 B2 | 1/2015 | Muff et al. | |
| 2005/0027858 A1 * | 2/2005 | Sloth | H04L 41/5009 709/224 |
| 2013/0339698 A1 | 12/2013 | Bonanno et al. | |
| 2014/0095849 A1 | 4/2014 | Xekalakis et al. | |
| 2014/0101413 A1 | 4/2014 | Heisch | |
| 2015/0205588 A1 * | 7/2015 | Bates | G06F 9/4552 717/145 |

FOREIGN PATENT DOCUMENTS

JP 04252336 A 9/1992

OTHER PUBLICATIONS

Giles R. Frazier, et al.,"Application-Level Processor Parameter Management", U.S. Appl. No. 14/958,151, filed Dec. 3, 2015.
(Continued)

Primary Examiner — Camquy Truong
(74) Attorney, Agent, or Firm — Cantor Colburn LLP; Steven Chiu

(57) ABSTRACT

Embodiments relate to application-level initiation of processor parameter adjustment. An aspect includes receiving, by a hypervisor in a computer system from an application running on the computer system, a request to adjust an operating parameter of a processor of the computer system. Another aspect includes determining an adjusted value for the operating parameter during execution of the application by the hypervisor. Another aspect includes setting the operating parameter in a parameter register of the processor to the adjusted value by the hypervisor. Yet another aspect includes executing the application according to the parameter register of the processor.

14 Claims, 3 Drawing Sheets

(56) References Cited

OTHER PUBLICATIONS

Giles R. Frazier, et al., "Performance Optimization Engine for Processor Parameter Adjustment", U.S. Appl. No. 14/958,153, filed Dec. 3, 2015.
IBM; "Event-Based Branch Facility [Category Served]"; PowerISA Version 2.047B; Book II, Chapter 7; p. 817-820; Apr. 9, 2015.
IBM; "Provide Platform Specific Run Time Services Using the Hypervisor System Calls for PowerPC Processor in Native SMP Mode"; ip.com; ip.com No. 000128814; p. 1-2; Sep. 19, 2015.
Jonathan D. Bradbury, et al.; "Fingerprint-Based Processor Parameter Management"; U.S. Appl. No. 14/958,142, filed Dec. 3, 2015.
List of IBM Patents or Patent Applications Treated as Related—Date Filed: Mar. 3, 2016; 1 page.
Mericas, A., et al; "IBM POWER8 Performance Features and Evaluation"; IBM J. Res. & Dev.; vol. 59, No. 1; paper 6; p. 6:1-6:10; Jan./Feb. 2015.

\* cited by examiner

APPLICATION-LEVEL INITIATION OF PROCESSOR PARAMETER ADJUSTMENT

BACKGROUND

The present invention relates generally to computer processors, and more specifically, to application-level initiation of processor parameter adjustment.

One of the functions of a managed run-time environment is processor performance optimization. Optimization typically involves compiling code so as to provide optimal processor performance for the current workload and hardware. Such code optimization may significantly improve processor performance during execution of the code. Processor performance may be further increased by adjustment of the hardware configuration and/or operating parameters of a processor to fit a specific workload. However, a hypervisor or operating system (OS), which may have access to the operating parameters of the processor, may have no knowledge of the actual current runtime environment workload.

SUMMARY

Embodiments include a method, system, and computer program product for application-level initiation of processor parameter adjustment. An aspect includes receiving, by a hypervisor in a computer system from an application running on the computer system, a request to adjust an operating parameter of a processor of the computer system. Another aspect includes determining an adjusted value for the operating parameter during execution of the application by the hypervisor. Another aspect includes setting the operating parameter in a parameter register of the processor to the adjusted value by the hypervisor. Yet another aspect includes executing the application according to the parameter register of the processor.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
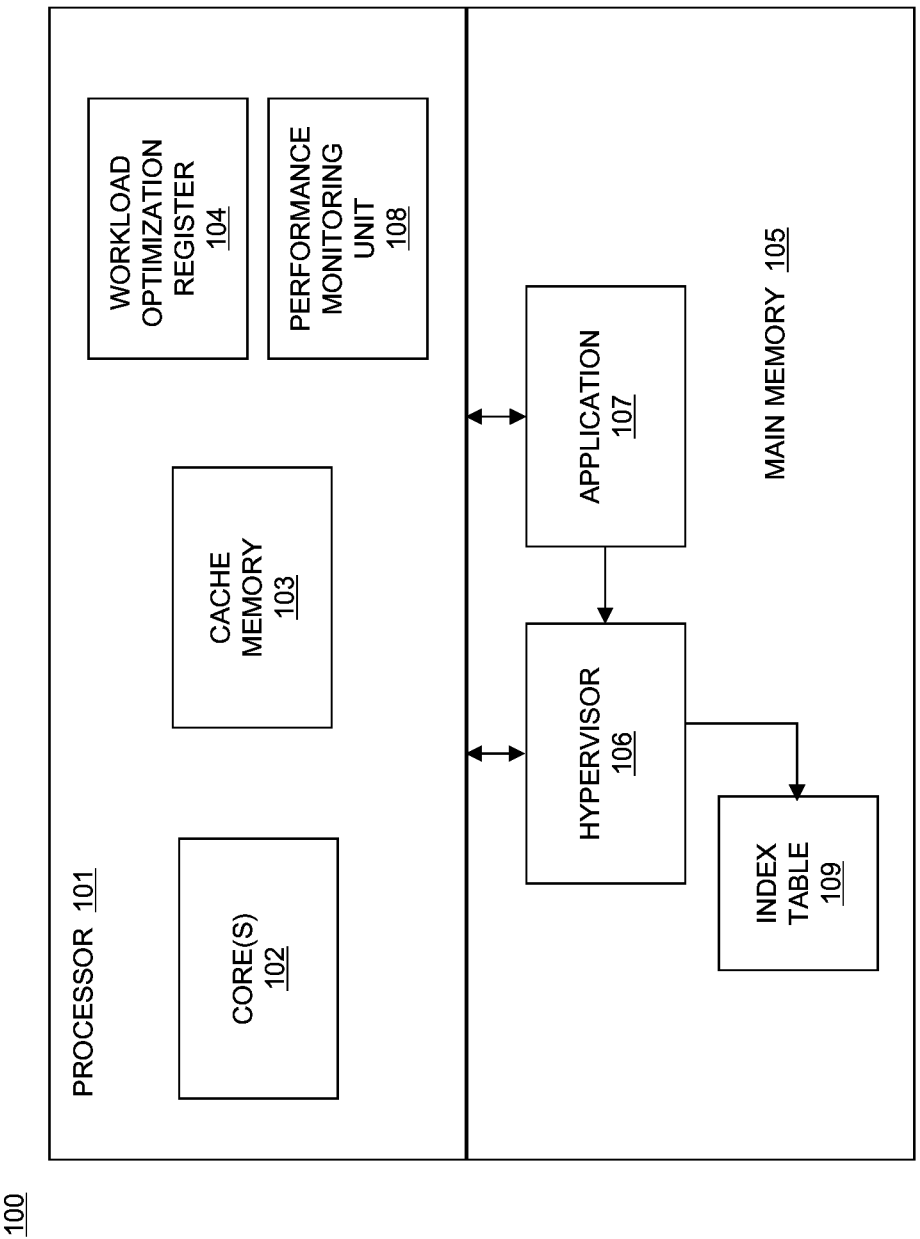
FIG. 1 depicts a system for application-level initiation of processor parameter adjustment in accordance with an embodiment.

Embodiments of application-level initiation of processor parameter adjustment are provided, with exemplary embodiments being discussed below in detail. Less-privileged software, such as an application or compiler, running on a computer system may request that the hypervisor or OS adjust various processor parameters to fit the current task. By performing such task-specific adjustments, processor performance may be improved. Optimized values for the processor parameters that are being adjusted are determined in the background while the requesting application is being executed.

Processor parameters may be stored in one or more registers in the processor. In some embodiments, such a register may be referred to as a workload optimization register (WOR). The WOR is written into by the hypervisor to set processor parameters. In some embodiments, additional registers holding values for additional control parameters may also be included in the processor. Processor parameters that may be stored in a WOR include, but are not limited to, the branch history algorithm, branch history depth, the cache data prefetch depth, whether to enable store-hit-load prevention, whether to route all fixed-point operations to the fixed point unit (FXU), whether to route all loads to the load unit (not the load store unit), the instruction prefetch depth, and the store gather window. Less privileged, or user-space software, such as an application, may issue a request to the hypervisor to adjust one of more of these processor parameters to fit the application's workload.

The request to adjust the processor parameters may be referred to as a hypervisor call (HCALL) in some embodiments, and may include an identifier, or index, corresponding to the application that issued the HCALL. A table may be maintained that associates indexes with respective WOR values. If an HCALL is received for which no index is listed in the table, a WOR value is determined for the current workload while the current workload is executing and stored in the table with an assigned index. The WOR value may be determined in any appropriate manner in various embodiments. In some embodiments, the HCALL may specify the one or more parameters (e.g., P1, P2, P3, etc.) to be adjusted; in such embodiments, only the parameters in the WOR that are specified in the HCALL are adjusted. For example, an HCALL may be limited to only branch prediction related parameters, or prefetch related parameters. An example of such an HCALL may take the form of: OPTIMIZE (P1, P2, . . . ,Pn; index). In some embodiments, an HCALL that does not specify any parameters may adjust all the parameters that are in the WOR. In further embodiments, the HCALL may further include a target performance. Issuing of the HCALL may be triggered by initiation of a new task in the processor in some embodiments. The adjustment of the parameters may be performed in the background during the execution of the task for which the parameters are being adjusted.

The determination of parameter values to match the current task may be performed using a performance monitoring unit (PMU), which operates in the background while the task executes to determine optimal parameter values. The PMU may be implemented in hardware or software in various embodiments. The PMU may issue interrupts to the hypervisor, or OS, that return performance data that was determined by the PMU, and the hypervisor or OS may then set the WOR based on the performance data provided by the PMU. For example, if data prefetch depth is the parameter to be optimized, the PMU may use a counter to count load instructions and another counter to count load cache hits. When one of these counts reaches a predetermined value, the PMU causes an interrupt to the hypervisor. The hypervisor then reads the counters, calculates the data cache hit rate (i.e. the percentage of load instructions that were able to access their data from the cache), and adjusts the optimized prefetch depth based the measured rate. For example, if the measured data cache hit rate is below a desired level, the hypervisor may increase the data prefetch depth; if the measured data cache hit rate was more than that required to attain an acceptable level of performance, then the hypervisor may decrease the data cache prefetch depth in order to conserve resources. Other embodiments may include a performance monitor that calculates the data cache hit rate prior to interrupting the hypervisor, thereby eliminating the need for the hypervisor to calculate the data cache hit rate from the counter values.

In some embodiments, if the index received with the HCALL is equal to a default value such as zero, the calling application is requesting that a new optimal WOR value, for all parameters that are stored in the WOR, be determined as the application executes. In further embodiments, an HCALL may specify that, for example, only branch prediction related parameters in the WOR be adjusted. In such an embodiment, the hypervisor may begin the WOR adjustment process by setting the branch-related WOR parameters to an initial value, setting up the PMU to monitor performance as execution of the calling application proceeds, and returns to the calling application. As interrupts, which may correspond to performance measurement periods, are issued by the PMU, the hypervisor handles them as needed. After the performance data has been gathered for a first branch history depth value, the hypervisor iterates through all other possible branch history depths to find the optimal depth corresponding to the current branch prediction algorithm. The hypervisor may then move on to a next branch prediction algorithm, and repeat the measurement process by iterating through all possible branch history depths to determine the optimal branch history depth for the optimal branch prediction algorithm. Whenever a performance level is measured by the PMU that exceeds all previously-measured performance values for other values of the parameters, the parameters associated with the measured performance level are stored. When the highest performance level is determined, the associated parameters are stored in the WOR and in the index table associated with an index. In some embodiments, if the index received with the HCALL is equal to a predetermined value, the calling application is requesting that the WOR contents be set back to a default value and any ongoing parameter optimization be terminated. The application might request a reset of the WOR to the default value after completing a first task and beginning to perform a subsequent task in some embodiments.

When the determination of new WOR parameter(s) is completed, the hypervisor may issue a lightweight interrupt (such as event-based branch (EBB)) that informs the calling application that the optimization is complete, and provides the calling application with a new index that is now associated with the new WOR value in the table. The runtime environment may use the provided index value in future HCALLs. The index may be transferred by the EBB in any appropriate manner. For example, in some embodiments, the index may be provided to the calling application in a preconfigured memory location. In other embodiments, the index may be provided via an event-based-branch status register.

FIG. 1 illustrates an embodiment of a computer system 100 for application-level initiation of processor parameter adjustment. Computer system 100 includes a processor 101 in communication with a main memory 105. The processor 101 includes one or more cores 102 that execute instructions using cache memory 103. Processor 101 further includes a WOR 104, which holds various parameters that dictates the functioning of the processor 101. Parameters that are stored in WOR 104 may include any of, but are not limited to, the branch history algorithm, branch history depth, the cache data prefetch depth, whether to enable store-hit-load prevention, whether to rout all fixed-point operations to the fixed point unit (FXU), whether to rout all loads to the load unit (not the load store unit), the instruction prefetch depth, and the store gather window. Computer programs, such as hypervisor 106 and application 107, are stored in main memory 105 and executed by the processor 101. Any appropriate number of applications may be executed by a computer system such as computer system 100. An application such as application 107 may issue a request to update processor parameters to the hypervisor 106 to update the parameters in WOR 104. In some embodiments, the application 107 may issue the request to update processor parameters to an OS that is executing on computer system 101 instead of a hypervisor. The updating of the parameters in response to the HCALL is performed using PMU 108 and index table 109, as discussed below with respect to FIG. 2. Index table 109 stores indexes and previously determined associated WOR values for reuse. The hypervisor uses PMU 108 to measure current processor performance, and chooses new parameters based on data from the PMU that match a current workload based on a received request to update processor parameters that does not include an index that is listed in the index table 109. PMU 108 may be implemented in hardware or software in various embodiments.

Figure 2:
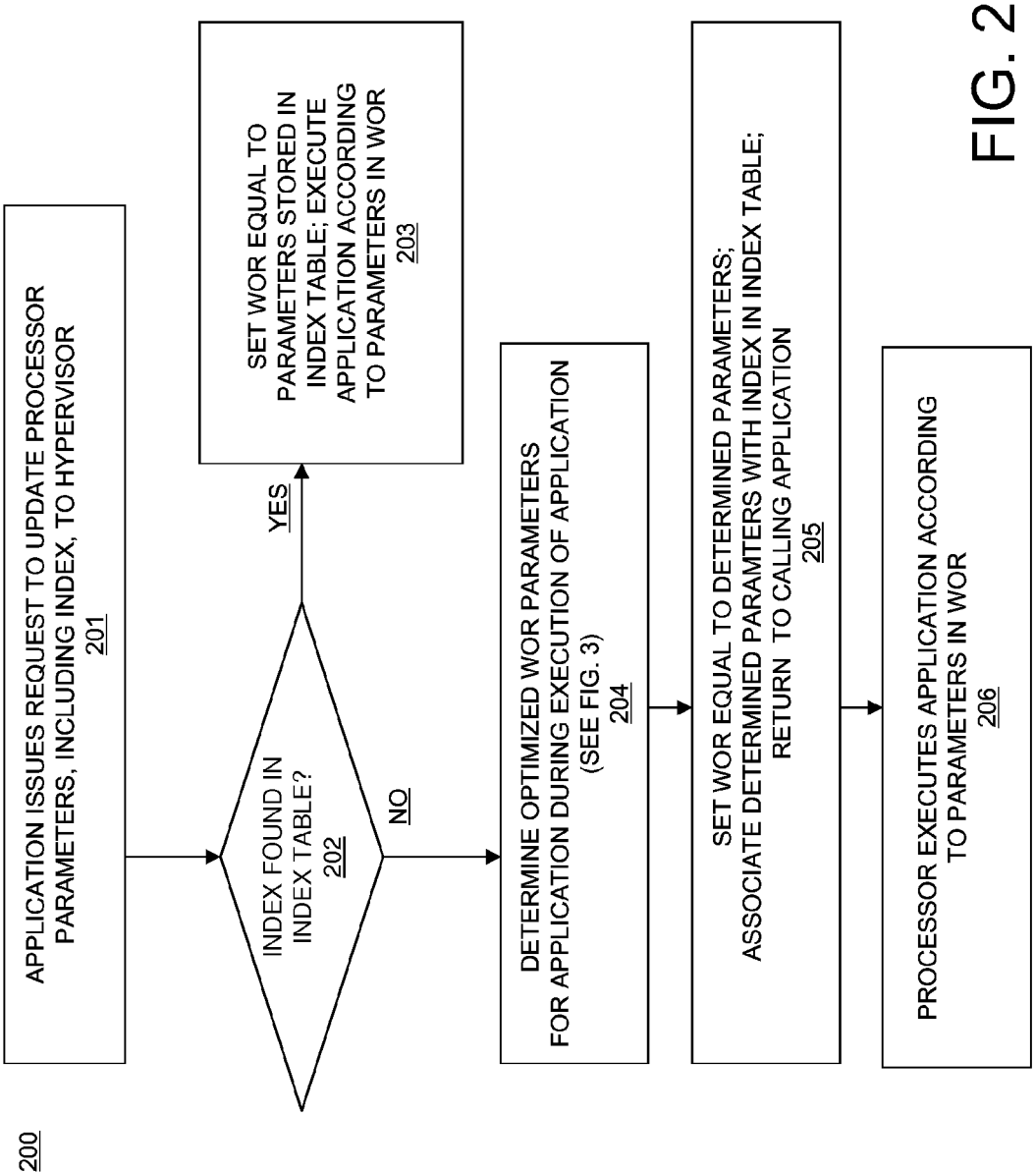
FIG. 2 depicts a process flow for application-level initiation of processor parameter adjustment in accordance with an embodiment.

FIG. 2 illustrates an embodiment of a method 200 for application-level initiation of processor parameter adjustment. FIG. 2 may be implemented in computer system 100 of FIG. 1. In block 201, an application, such as application 107, issues request to update processor parameters in the WOR 104, which may be, in some embodiments, HCALL (index) or OPTIMIZE (index), to a hypervisor 106 or an OS in the computer system 101. The request to update processor parameters may further specify, in some embodiments, a subset of the processor parameters in the WOR 104 to be adjusted (e.g., HCALL(index, $P_1, \ldots, P_N$)). The sending of the request to update the processor parameters may be triggered by starting of a new workload by the application 107, starting processing of new data by the application 107, or for any other appropriate reason in various embodiments. Next in block 202, it is determined by the hypervisor 106 whether the index that was included in the request to update processor parameters is in the index table 109. If the index that was received in the request to update processor parameters is listed in the index table 109, flow proceeds to block 203, in which the WOR 104 is set equal to the WOR value that is associated with the index in the index table 109 by the hypervisor 106. The processor 101 then resumes executing the calling application according to the parameters in the WOR 104.

If it is determined in block 202 that the index that was included in the request to update processor parameters is not in the index table 109, flow proceeds to block 204 from block 202. In block 204, adjusted, or optimized, parameter values are determined while the calling application executes. In some embodiments, all of the parameters stored in the WOR 104 may be optimized in block 204. In other embodiments, only a subset of the parameters that were specified by the request to update processor parameters is optimized in block 204. Block 204 may be implemented in the hypervisor 106 using PMU 108, and is discussed in further detail with respect to FIG. 3. Then, in block 205, the parameters that were determined in block 204 are written into the WOR 104 by the hypervisor 106, and execution returns to the application 107. The parameters that were determined in block 204 are also stored in the index table 109 with an associated index. The associated index may be different from the index that was received with the request in block 201, in which case, the associated index is also returned to the calling application 107 for future use. The associated index may be returned to the application 107 via an EBB or a status register in various embodiments. Lastly, in block 206, the processor 101 executes the application 107 according to the parameters in the WOR 104.

Figure 3:
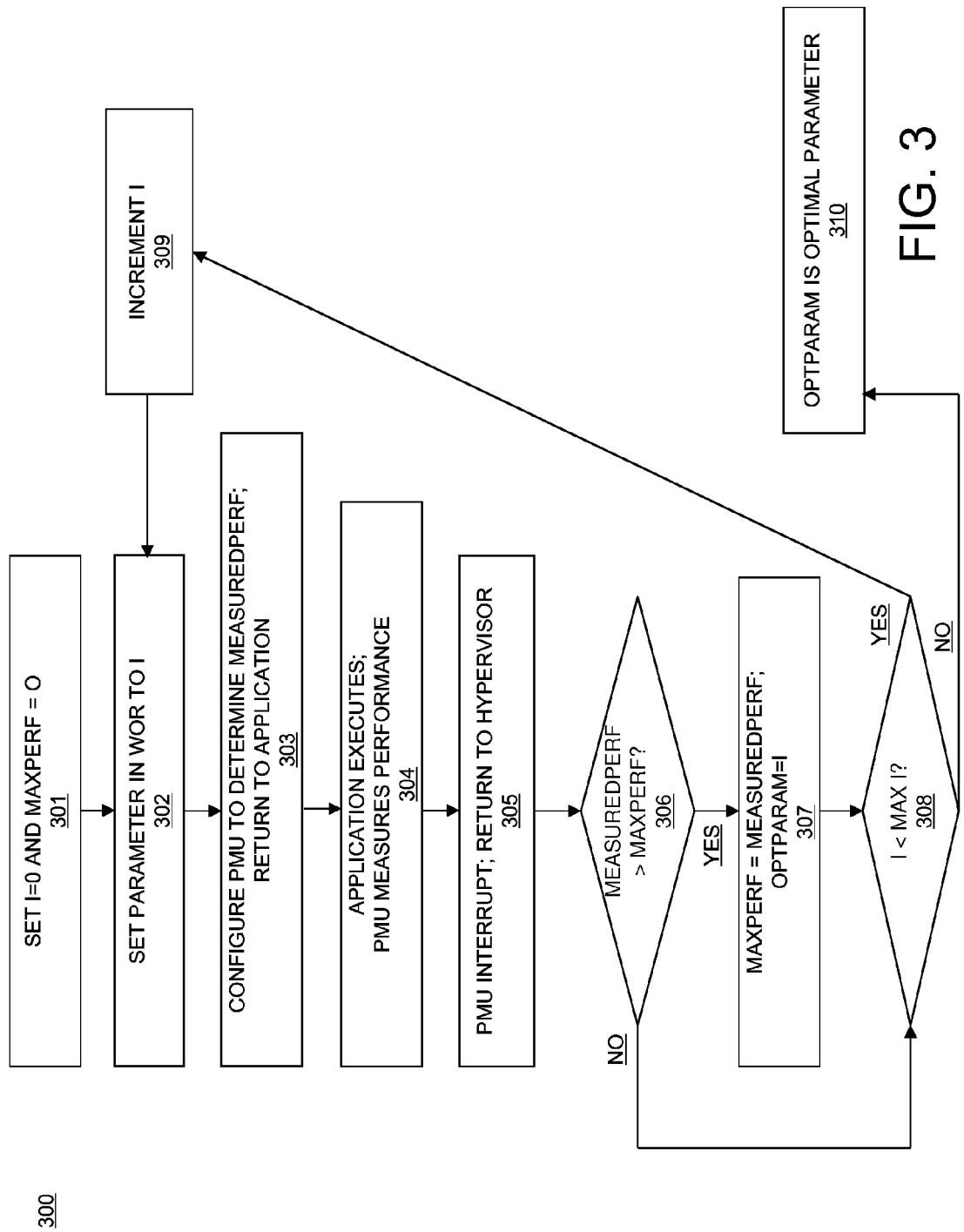
FIG. 3 depicts a process flow for new parameter determination in accordance with an embodiment.

FIG. 3 illustrates an embodiment of a method 300 for adjusted parameter determination. Method 300 is implemented in computer system 101 of FIG. 1, and may be performed in embodiments of block 204 of FIG. 2. Method 300 illustrates determination of a single parameter; however, in various embodiments of parameter adjustment, multiple parameters may be adjusted simultaneously by iterating through all combinations of values for all of the parameters that are being adjusted. First, in block 301, in hypervisor 106, a variable I is set equal to zero, and a variable MAXPERF (i.e., maximum performance) is set equal to zero. Then, in block 302, the parameter that is being adjusted is set equal to I in the WOR 104 by hypervisor 106. In block 303, the hypervisor 106 configures the PMU 108 to measure the performance of the processor 101. The hypervisor 106 may configure the PMU 108 to measure performance in any appropriate manner and for any appropriate amount of time. The hypervisor 106 then returns execution to the application 107 that issued the HCALL or OPTIMIZE request. Then, in block 304, the processor 101 executes the application 107 using the current value of I in the WOR 104, and the PMU measures the current performance of the processor 101 while the application 107 is executed. The PMU 108 measures the performance according to the configuration by the hypervisor 106 that was performed in block 303, for example, for a specified amount of time. Then, in block 305, when the PMU completes the performance measurement (i.e. determines the value of MEASUREDPERF), an interrupt is issued to transfer control back the hypervisor 106. In block 306, the hypervisor 106 determines whether the measured performance is greater than MAXPERF. If it is determined in block 306 that the measured performance is greater than MAXPERF, flow proceeds from block 306 to block 307. In block 307, MAXPERF is set equal to the measured performance, and a variable OPTPARAM is set equal to I. Flow then proceeds from block 307 to block 308.

If it is determined in block 306 that the measured performance is not greater than MAXPERF, flow proceeds from block 306 directly to block 308. In block 308, it is determined whether I is less than the maximum possible value (i.e., $I_{MAX}$) of the parameter that is being optimized. If it is determined in block 308 that I is less than $I_{MAX}$, flow proceeds from block 308 to block 309, in which I is incremented. Blocks 302, 303, 304, 305, 306 optionally 307, and 308, are repeated until it is determined in block 308 that I is not less than $I_{MAX}$, at which point flow proceeds from block 308 to block 310, and the value OPTPARAM is determined to be the optimal parameter.

In some embodiments, if other parameters are also to be optimized, then method 300 may be repeated, as necessary, for all parameters in the WOR 104 that are being optimized so as to obtain optimal performance for processor 101. Any optimization procedure may be used during the optimization process, including optimizing parameters one at a time in any appropriate order, measuring performance of all combinations of parameters to determine the optimal combination, repeating the optimization of some parameters after others have been changed, or employing algorithms such as machine learning algorithms to determine the optimal parameter set.

Technical effects and benefits include improved performance in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for application-level initiation of processor parameter adjustment, the method comprising:
   receiving, by a hypervisor in a computer system from an application running on the computer system, a request to adjust an operating parameter of a processor of the computer system, wherein the request comprises an index;
   determining whether the index is listed in an index table with an associated parameter register value and whether the index is a default index that is not listed in the index table;
   based on determining that the index is not listed in the index table:
      determining an adjusted value for the operating parameter during execution of the application by the hypervisor; and
      setting the operating parameter in a parameter register of the processor to the adjusted value by the hypervisor;
   based on determining that the index is listed in the index table, setting the parameter register equal to the associated parameter register value;
   based on determining that the index is a default index that is not listed in the index table;
      determining an adjusted value for a plurality of operating parameters that are stored in the parameter register;
      assigning an index to the application;
      storing the adjusted value for the plurality of operating parameters in the index table with the assigned index; and
      returning the assigned index to the application; and
   executing the application according to the parameter register of the processor.

2. The method of claim 1, further comprising writing the index and the determined adjusted value into the index table.

3. The method of claim 1, wherein the parameter register holds values for the plurality of operating parameters, and the request specifies a subset of the plurality of operating parameters to be adjusted.

4. The method of claim 3, wherein the plurality of operating parameters comprises a branch history algorithm, a branch history depth, a cache data prefetch depth, whether to enable store-hit-load prevention, whether to route all fixed-point operations to a fixed point unit (FXU), whether to route all loads to a load unit, an instruction prefetch depth, and a store gather window.

5. The method of claim 1, wherein determining an adjusted value for the operating parameter during execution of the application comprises:
   iterating through all possible values of the operating parameter;
   measuring performance of the processor for each of the possible values by a performance monitoring unit; and
   determining a value of the operating parameter that gives a highest performance of the processor.

6. A computer program product for implementing application-level initiation of processor parameter adjustment, the computer program product comprising:
  a computer readable storage medium having program instructions embodied therewith, the program instructions readable by a processing circuit to cause the processing circuit to perform a method comprising:
  receiving, by a hypervisor in a computer system from an application running on the computer system, a request to adjust an operating parameter of a processor of the computer system, wherein the request comprises an index;
  determining whether the index is listed in an index table with an associated parameter register value and whether the index is a default index that is not listed in the index table;
  based on determining that the index is not listed in the index table:
    determining an adjusted value for the operating parameter during execution of the application by the hypervisor; and
    setting the operating parameter in a parameter register of the processor to the adjusted value by the hypervisor;
  based on determining that the index is listed in the index table, setting the parameter register equal to the associated parameter register value;
  based on determining that the index is a default index that is not listed in the index table:
    determining an adjusted value for a plurality of operating parameters that are stored in the parameter register;
    assigning an index to the application;
    storing the adjusted value for the plurality operating parameters in the index table with the assigned index; and
    returning the assigned index to the application; and
  executing the application according to the parameter register of the processor.

7. The computer program product of claim 6, further comprising writing the index and the determined adjusted value into the index table.

8. The computer program product of claim 6, wherein the parameter register holds values for the plurality of operating parameters, and the request specifies a subset of the plurality of operating parameters to be adjusted.

9. The computer program product of claim 8, wherein the plurality of operating parameters comprises a branch history algorithm, a branch history depth, a cache data prefetch depth, whether to enable store-hit-load prevention, whether to route all fixed-point operations to a fixed point unit (FXU), whether to route all loads to a load unit, an instruction prefetch depth, and a store gather window.

10. The computer program product of claim 6, wherein determining an adjusted value for the operating parameter during execution of the application comprises:
  iterating through all possible values of the operating parameter;
  measuring performance of the processor for each of the possible values by a performance monitoring unit; and
  determining a value of the operating parameter that gives a highest performance of the processor.

11. A computer system for application-level initiation of processor parameter adjustment, the system comprising:
  a memory; and
  a processor, communicatively coupled to said memory, the computer system configured to perform a method comprising:
    receiving, by a hypervisor in the computer system from an application running on the computer system, a request to adjust an operating parameter of a processor of the computer system, wherein the request comprises an index;
    determining whether the index is listed in an index table with an associated parameter register value and whether the index is a default index that is not listed in the index table;
    based on determining that the index is not listed in the index table:
      determining an adjusted value for the operating parameter during execution of the application by the hypervisor; and
      setting the operating parameter in a parameter register of the processor to the adjusted value by the hypervisor;
    based on determining that the index is listed in the index table, setting the parameter register equal to the associated parameter register value;
    based on determining that the index is a default index that is not listed in the index table:
      determining an adjusted value for a plurality of operating parameters that are stored in the parameter register;
      assigning an index to the application;
      storing the adjusted value for the plurality of operating parameters in the index table with the assigned index; and
      returning the assigned index to the application; and
    executing the application according to the parameter register of the processor.

12. The system of claim 11, further comprising writing the index and the determined adjusted value into the index table.

13. The system of claim 11, wherein the parameter register holds values for the plurality of operating parameters, and the request specifies a subset of the plurality of operating parameters to be adjusted.

14. The system of claim 13, wherein the plurality of operating parameters comprises a branch history algorithm, a branch history depth, a cache data prefetch depth, whether to enable store-hit-load prevention, whether to route all fixed-point operations to a fixed point unit (FXU), whether to route all loads to a load unit, an instruction prefetch depth, and a store gather window.

* * * * *